United States Patent [19]

Willocx et al.

[11] Patent Number: 5,343,520
[45] Date of Patent: Aug. 30, 1994

[54] IMPEDANCE SYNTHESIS MULTILE LOOP USING FILTERING MEANS

[75] Inventors: Eddie L. M. Willocx, Willebroek; Pierre-Paul F. M. M. Guebels, Edegem; Elve D. J. Moons, Lummen, all of Belgium

[73] Assignee: Alcatel N.V., Amsterdam, Netherlands

[21] Appl. No.: 699,954

[22] Filed: May 13, 1991

[30] Foreign Application Priority Data

May 11, 1990 [EP] European Pat. Off. ........ 90201196.4

[51] Int. Cl.$^5$ ............................................. H04M 1/00
[52] U.S. Cl. ..................................... 379/399; 379/377
[58] Field of Search ............... 379/399, 412, 413, 402, 379/389, 377

[56] References Cited

U.S. PATENT DOCUMENTS

| 4,539,438 | 9/1985 | Rosenbaum | 379/413 |
|---|---|---|---|
| 4,560,835 | 12/1985 | Bourgonje | 379/413 |
| 4,631,359 | 12/1986 | Johansson et al. | 379/413 |
| 4,712,233 | 12/1987 | Kuo | 379/399 |
| 4,760,595 | 7/1988 | Arai . | |
| 4,764,956 | 8/1988 | Rosch et al. . | |
| 4,837,818 | 6/1989 | Pieters et al. . | |
| 4,864,609 | 9/1989 | Moisin | 379/399 |
| 4,914,693 | 4/1990 | Beck et al. | 379/413 |

FOREIGN PATENT DOCUMENTS

| 0145038 | 6/1985 | European Pat. Off. . |
|---|---|---|
| 0215677 | 3/1987 | European Pat. Off. . |
| 0272800 | 6/1988 | European Pat. Off. . |
| 2597279 | 10/1987 | France . |
| 8815417 | 11/1988 | France . |
| 9007834 | 7/1990 | PCT Int'l Appl. . |

OTHER PUBLICATIONS

Jozef F. Pieters, et al., "A Monolithic 70-V Subscriber ...", IEEE Journal of Solid-State Circuits, vol. sc-21, No. 2. Apr. 1986.

M. Ferry, "Trip Detecting Circuit", IBM Corp. Technical Disclosure Bulletin, vol. 20, No. 3, Aug. 1977.

Primary Examiner—James L. Dwyer
Assistant Examiner—Jack Chiang
Attorney, Agent, or Firm—Robbins, Berliner & Carson

[57] ABSTRACT

To supervise a telephone subscriber line (v'2, v'1,) and provide it with adjustable AC and DC termination impedances from the exchange (v1, v2), these are supplied by an impedance synthesis multiple loop split into separate DC and AC loop parts by filters at the output of a sense amplifier in the common loop part and fed (e) through a Herter bridge. The amplifier AC output has however to be limited to avoid saturation by a larger DC signal. It now includes a Miller effect integrator output stage (A2) with a low pass frequency response supplying the DC loop and also feeding back an input stage (A1) so that the latter exhibits a high pass frequency response with a DC free output to drive the AC loop and the consequent ability to supply a larger AC output. Further circuits improve dial pulse detection (LP), reduce external capacitances (C1) and limit power consumption (PG5 and PG6).

9 Claims, 2 Drawing Sheets

IMPEDANCE SYNTHESIS MULTILE LOOP USING FILTERING MEANS

TECHNICAL FIELD

The invention relates to an impedance synthesis multiple loop using filtering means in association with a common loop and with separate DC and AC loop parts.

BACKGROUND ART

A circuit of this type is known for instance from the European patent application published under No 0201635 which corresponds to commonly assigned U.S. Pat. No. 4,834,818 (J. Pieters-P. Guebels 3-4). It can be used in telecommunication line circuits in order to synthesize suitable signal (AC) impedances presented to various telecommunication lines from an exchange, as well as resistances (DC) to feed the equipment connected to such exchanges via the telecommunication lines, i.e. provide adequate AC and DC terminating impedances under various line conditions. In this known circuit, particular use of a Herter bridge, providing immunity against longitudinal currents, is made in association with a common sense amplifier which is designed to react to a variety of signals having widely differing characteristics such as speech signals, DC signals and relatively high voltage AC ringing currents. This sense amplifier is included in the common loop part and its output feeds separate filter circuits included in both the DC and AC loop parts. In particular, the separate AC loop includes a DC blocking serial capacitance which has a relatively large value for a suitable high pass cut off characteristic eliminating DC but passing the lowest frequency voice signals. Also, in order to cater for the variety of signals that may appear at the input of the sense amplifier, the latter must be carefully designed to avoid saturation by the higher amplitude input signals. Input biassing resistances are used at each of the two inputs terminals of an operational amplifier constituting the sense amplifier. These input biassing resistances are connected to two auxiliary potentials distinct from either ground (0 Volt) or battery potential (−48 Volts), e.g. −33 and −40.5 Volts respectively. As explained in the European application referred to, the first auxiliary potential enables to avoid saturation of the sense amplifier when relatively high voltage ringing signals are applied to the telephone line through the Herter bridge. The second auxiliary potential is used as a special common reference potential for the signals appearing in various parts of the telecommunication line circuit. Since the internal impedances of such auxiliary biassing sources, and particularly the second can never be ideally small, the design must also take care that it will not lead to an unacceptable level of parasitic cross coupled signals.

The circuit according to the published PCT application WO 90/07834 (P. Guebels 8) improves the structure of such an impedance synthesis multiple loop by avoiding previous constraints and more particularly reduces the value of the above filter capacitance, enable a higher AC output from the sense amplifier and avoids a special common reference potential. In this known circuit the filtering means include a transducer fed from the common loop part and with an input stage cascaded with an output stage, an overall negative feedback loop extending from the output of the output stage to the input of the input stage and one of said stages providing to the AC loop part an output signal excluding low frequency components such as DC, the latter appearing only at the output of the other stage feeding the DC loop part.

In this manner, the sense amplifier is now realized as a frequency dependent two-stage amplifier with overall feedback and with the outputs of these two stages supplying directly the low pass, e.g., DC, and high pass (AC) signals respectively.

The input stage of this known circuit further provides the output signal excluding low frequency components such as DC.

DISCLOSURE OF INVENTION

This is particularity advantageous for the telecommunication line circuit applications envisaged since in the previously identified European patent application, the amount of gain of the sense amplifier was limited in order to avoid saturation, the AC signal having a relatively small amplitude superposed on a much larger DC amplitude occupying a substantial part of the available voltage range at the output of the sense amplifier. With the new design however, most of that voltage range can be occupied by the output AC signal excursions devoid of any DC component, the latter being only permitted to appear at the output of the output stage, this being eventually true also for low frequency ringing signals. Thus, with only AC signals remaining at the output of the input stage it is now possible to define the gain of that part of the sense amplifier as a function of the maximum AC signal and independently of the DC component.

With a structure as defined in the above PCT application WO 90/07834, a more specific object of the invention is to enable its use in a Subscriber Line Interface Circuit (SLIC) adapted to handle not only voice signals but also remote metering signals above the voice frequency range. Such a SLIC is disclosed for instance in the above-identified European application No 0201635 as well as in the IEEE Journal of Solid-State Circuits, VOL. SC-21, No 2, April 1986, p. 252–258. In this earlier application, one of the separate filter circuit included in the DC loop part is designed to eliminate bursts of metering signals at 12 KHz or 16 Khz and a similarly positioned metering filter in the SLIC described in the above article is of the first order with roll off at 1200 Hz, On the other hand, as disclosed in the above European application, low frequency dial pulses must be detected and splitting the above low pass and high pass outputs at a relatively low frequency, i.e. between DC and the lowest voice frequency, is not compatible with a reasonable reproduction of these interruptions of the DC line current. Indeed, at 10 or 20 cycles per second, a sufficient number of harmonics of the fundamental frequency should be allowed to pass towards the detector in such a way that the rectangular dialling pulses are not unduly distorted, Moreover, the frequency split produced by a sense amplifier resorting to a single capacitance, e.g. 100 nF as an external component, is also not conducive to an adequate elimination of the burst of high amplitude metering pulses at 12 or 16 KHz, In accordance with a first characteristic of the invention, the outputs of the input and output stages are coupled to respective inputs of a double input low pass filter with an output cut off at a higher frequency than that separating the frequency components at the outputs of the input and output stages.

Such a recombination low pass filter can advantageously be realised by a double input first order switched capacitance low pass filter, e.g. 400 Hz, which adequately reduces the bursts of metering signals and allows proper detection of dial pulses while the input and output stages of the frequency dependent two-stage sense amplifier produce signals for the separate AC and DC loop parts in the advantageous manner described, e,g, avoiding saturation by relatively high voltage signals.

Again with a structure as defined in the above PCT application, a more specific object of the invention is to reduce the power dissipation of the SLIC, this being an important requirement for Large Scale Integration chip designs. As in the above application, an operational amplifier can be used, i.e. the input stage of the sense amplifier in the present application, and distinct DC biasses at its inverting and non-inverting inputs enable to limit the magnitudes of the common mode signal at these inputs and produced as a result of high voltage ringing signals being applied to the subscriber's line. Such distinct biasses imply both distinct DC bias potentials and distinct biassing resistances when taking into account not only the need to limit voltages appearing during the subscriber ringing condition but also the conditions enabling sense amplifier signals solely dependent on the line signals to the exclusion of the biassing sources at the inputs of this amplifier.

In accordance with a second characteristic of the invention, the input terminals of the input stage are each biassed by a potentiometer, both potentiometers being branched across a common DC potential source with the help of controlled gating means enabling to simultaneously disconnect a pole of the source for each of the two potentiometers.

In this way, it has become possible to substantially reduce the power consumption of the chip in off hook or power down conditions while maintaining suitable design conditions. Additionally, disconnection of one of the two potentiometer resistances, in each of the pairs being used to bias the two input terminals of an operational amplifier constituting the input stage, improves the noise behaviour of the sense amplifier.

While at least one biassing potentiometer was already used in the above European application, as well as a biassing potential distinct from these appearing at the telephone exchange battery poles, these remained permanently connected. This is also true for the two biassing potentiometers, branched across a DO potential source separate from the exchange battery, attenuating common mode signals, and disclosed in the IBM Technical Disclosure Bulletin, Vol. 20, No 3, August 1977, p. 1045/6.

Yet again with a structure as defined in the above-identified PCT application, a more specific object of the invention is to reduce the number of external components associated with a chip constituting the essential element of a SLIC. Such an external component is a 470 nF shunt capacitance part of a low pass filter included in the DC loop part and found in the above-identified European application No 0201635. This filter is part of the ring trip circuit detecting off hook and precedes a comparator thereby preventing the latter from reacting to spikes. This shunt capacitance is isolated by two series pass gates unblocked by a controlling ringing bit signal while it is short circuited by a third pass gate in the absence of this ringing bit.

On the other hand, 12/16 KHz metering signals can, for some telephone systems, be a collection of metering bursts or, for others, be a continuous metering signal which it is desirable to divide into bursts under the control of a metering shaping bit. In the manner disclosed in the published European patent application No 0145038 (D. Rabaey 1), the 12 or 16 KHz sine waves are converted into trains of metering pulses with sloping edges using a ramping capacitance.

In accordance with a third characteristic of the invention, the output of the output stage is coupled to a low pass filter including a capacitance having at least one of its terminals connected to a pair of controlled gating means, the first effectively inserting the capacitance into the low pass filter and the second into a telephone metering pulse shaping circuit, Indeed, with the sense amplifier now realized as a frequency dependent transducer with separate low pass and high pass output responses, the capacitance of the subsequent low pass filter, e.g. 220 nF, can be used also for shaping metering pulses, i,e, in time division multiplex fashion as in the published French patent application No 2597279 for switched capacitance filters where the capacitance value can also be varied by using a set of capacitances with binary weighted values but which method cannot save components when only two values are needed.

BRIEF DESCRIPTION OF DRAWINGS

The above mentioned and other objects and features of the invention will become more apparent and the invention itself will be best understood by referring to the following description of preferred embodiments taken in conjunction with the accompanying drawings wherein.

BEST MODE FOR CARRYING OUT THE INVENTION

Figure 1:
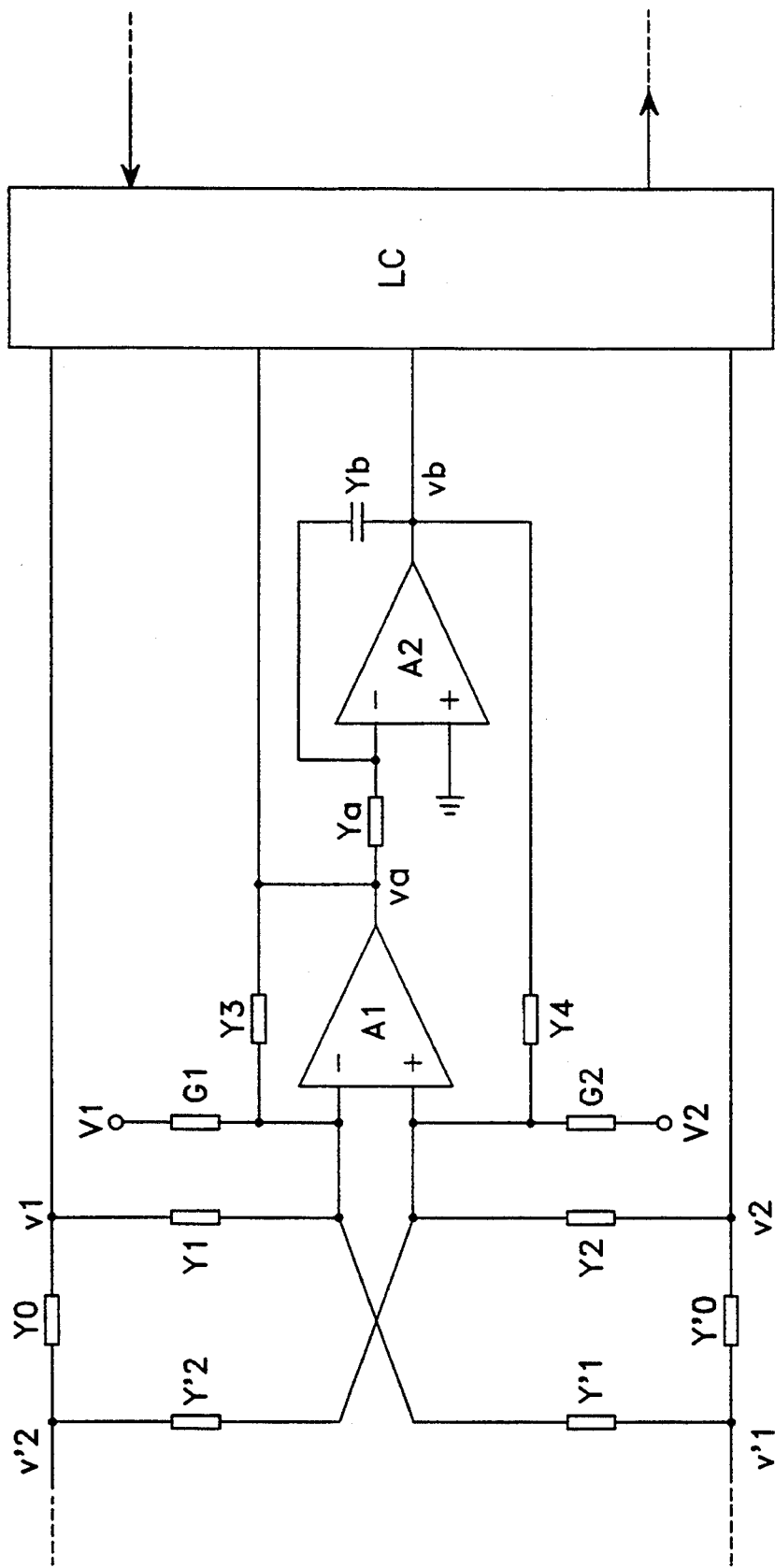
FIG. 1 shows that part of a SLIC including a Herter bridge feeding a two-stage sense amplifier in accordance with the above-identified PCT application WO 90/07834 and having separate outputs for the AC and DC synthesis loops.

Referring to the prior art circuit of FIG. 1, the Herter bridge is the classical one discussed in the above identified European patent application and is generally embedded in the same manner in the SLIC. Thus, it is essentially a hexapole network with six impedances in a closed ring and three distinct ports, the two terminals of each port being separated by two parallel sets of three impedances in series. The first port coresponding to the indicated signal voltages v1 and v2 is connected to the remaining part LC of the telephone line circuit, the second port corresponding to the indicated signal voltages V'2 and V'1 goes towards the distant telephone subset or other apparatus (not shown) while the third port has its two terminals identified by the common mode voltage signal e appearing at both the inverting and non-inverting input terminals of operational amplifier A1 constituting the input stage of the sense amplifier and to which this third port is connected. Part LC containing the rest of the multiple loop also gives access to the telephone exchange on a four wire basis as opposed to the bidirectional telephone line on the other side.

To simplify some of the subsequent relations, the six impedances constituting the hexapole or Hertar bridge have been labelled using an admittance notation so that one has a potential difference v'2−v'1 across feed admittance Y0 and likewise, v2−v'1 across feed admittance Y'0 for the other subscriber wire. In the classical manner for a Herter bridge affording immunity against longitudial currents and other advantages explained in detail in the above identified European patent application, these feed admittances are relatively high (low resistances), contrary to the remaining four admittances which have relatively low values, i.e. high resistance potentiometers constituted by admittances Y1 and Y'1 in series between the terminals having potentials v1 and v'1, and correspondingly for Y2 in series with Y'2 between v2 and v'2, the potentiometer tapping points constituting the inputs of the first stage A1 of the sense amplifier.

As shown, the inverting input of that stage is biassed to a potential V1 through conductance G1 while the non-inverting input is biassed to V2 through G2. The amplifier input stage A1 develops an output signal va at its output which is coupled to the inverting input of A1 through admittance Y3 as well as to LC in order to complete part of the multiple loop back to the Herter bridger (v1, v2).

So far, the circuit has the general configuration already disclosed in the above identified European NO 0201635 but in contradistinction thereto, the input stage A1 is not a separate sense amplifier to be followed by two separately branched filters at its output in order to isolate the AC and DC signals. Instead, A1 feeds a second amplifier stage A2 and particularly its inverting input since it is also an operational amplifier, and this through the series admittance Ya. This second stage A2 has its non-inverting input suitably biassed, e.g. to ground as indicated, and its output at which a signal vb is developed is connected to its inverting input through admittance Yb. As illustrated, Yb is a capacitance, contrary to the other two-terminal elements such as Ya which are all illustrated as resistances. In addition to the feedback connection between the output of A2 and its inverting input, a further negative feedback connection goes towards the non-inverting input of A1 through admittance Y4.

In this manner, it has been found possible to develop a high pass output va from which the DC component has been eliminated and this is used in the AC loop part through the remaining part LC of the circuit. On the other hand, at the output of A2, the vb response is a low pass function giving a DC signal which feeds the DC loop part also through LC.

While A2 is essentially a Miller effect integrator and the negative feedback connection over the two stages A1 and A2 enables A1 to exhibit a high pass response without a DC component, the following analysis identifies various interacting design parameters.

One may write three current node equations corresponding to the inverting and non-inverting inputs of A1 and to the inverting input of A2 in that order, i.e.

$$(v1-e)Y1-(v'1-e)Y'1-(V1-e)G1-(va-e)Y3=0 \quad (1)$$

$$(v2-e)Y2-(v'2-e)Y'2-(V2-e)G2-(vb-e)Y4=0 \quad (2)$$

$$(va)Ya+(vb)Yb=0 \quad (3)$$

The above takes into account the usual conditions at the two input terminals of operational amplifiers, i.e. negligible input our rents and same common mode voltage.

Since there are three unknown voltages, i.e. va, vb and e, these can be explicitly produced from the above and by simpler expressions if one bears in mind the constraint already highlighted in the above identified European No 0201635 and namely that the output voltage of the first stage A1, and accordingly that of the output stage A2 in view of the simple relation (3), should solely be proportional to the sum of the voltages across feed admittances Y0 and Y'0. In other words, one should have $$va=m(v2-v'1+v'2-v1) \quad (4)$$

in which m is some dimensionless parameter. In order to achieve such a form for va as the above, by replacing into (1), (2) and (3), it can be shown that such a result for va, i.e. directly proportional to the current flowing into the subscriber line through the first wire and returning through the second, without any other component for va depending on the bias voltages V1 and V2 can be secured provided $$Y1=Y'1 \quad (5)$$

$$Y2=Y'2 \quad (6)$$

$$Y1(G2+Y4)=Y2(G1+Y3) \quad (7)$$

$$G1.Y2.V1=G2.Y1.V2 \quad 8)$$

This last out of the four above relations will also be satisfied irrespective of the values of the admittances involved in the particular case of both V1 and V2 being 0.

Using these four constraints on the parameters, the voltage transfer function for va given by m is defined by $$m(n+1)Y3=Y1 \quad (9)$$

in which the further dimensionless parameter n is given by $$n.Y2.Y3.Yb=Y1.Y4.Ya \quad (10)$$

Thus, m being now identified in function of the admittance parameters, the response va is fully determined whereby this is also true for vb in view of the simple relation (3) between the two. On the other hand, using the constraints (5) to (8) as well as the parameters m and n defined by (9) and (10), the common mode voltage e at the two inputs of stage A1 is identified by $$e(2Y1+G1+Y3)=m(n.v1+n.v'1+v2+v'-2)Y3+V1.G \quad (11)$$

The voltage transfer function for the output voltage va is given by m appearing in (4) and defined by (9) and (10) from which it is seen that m can be expressed as a function of the ratio between Ya and Yb. In view of this ratio also linking the output voltages va and vb in the manner defined by (3) if Ya and/or Yb are/is the only frequency dependent admittance(s) in the above expressions, then it is possible to obtain frequency complementary characteristics for the output voltages va and vb. For the circuit shown where Ya is purely resistive and Yb is purely capacitive, a high pass frequency characteristic is obtained for va and a low pass one for vb. By inverting the nature of these two elements, i.e. a capacitance for Ya and a resistance for Yb, the frequency responses would be exchanged so that the low pass one would appear at the output of the input stage A1 and the high pass characteristic at the output of the output stage A2. However, the circuit shown has the advantage that the output amplifier stage A2 is an integrator whereas otherwise it would become a differentiator, the latter being known to be more sensitive to high frequency noise in view of the series input capacitance. Foremost, obtaining the high pass frequency characteristic at the output of the first stage A1 is advantageous when a DC component can have a substantial amplitude much larger than the AC signal amplitude superposed thereon. Indeed, in such a case one must then restrict the gain of A1 in order to prevent saturation, due to most of the available output voltage range being occupied by the output DC signal. This problem is eliminated by removing the DC signal from the output of the first stage A1 and providing this DC signal at the output of the second stage A2 instead.

In a Herter bridge used in a telephone line circuit to couple an outside balanced subscriber line to the rest of the telephone exchanger it is often required to have symmetry for the corresponding elements associated with the two wires of the line so that one will have not only the relations (5) and (6) but all four admittances Y1, Y'1, Y2 and Y'2 will be equal to one another Just as this will be the case for the series feed admittances Y0 and Y'0 also part of the Herter bridge. For instance, while these last two might correspond to 50 Ohm resistances, the remaining four impedances constituting the two cross connected potentiometers characteristic for the Herter bridge might each have a value of 60 kOhm.

With such an additional relation as Y1=Y2, the respective gains obtained at the outputs of A1 and A2 will still be determined by the ratio between Y1 and Y3 appearing in (9) and between Y3 and Y4 present in (10), this apart from the frequency response determined by such an admittance as Yb appearing also in the latter. Assuming for instance that unity gain is desired for A1 at high frequency whereas only a gain of ½ (in absolute value) is desired at the output of A2 for DC, this can be obtained by choosing the same value for Y3 as for Y1, e.g. resistances of 60 kOhm, whereas Y3 will only have half the value of Y4, e.g. a 30 kOhm resistance for the latter. In such a case one can write $$m = \frac{1}{1+n} = \frac{Yb}{2Ya+Yb} = \frac{pCR}{2+pCR} \quad (12)$$

in which the first expression for m defining va in view of (4) is directly obtained in function of n in view of (9) whereas (10) enables n to be expressed in function of the ratio between Ya and Yb giving the final expression in terms of R, the pure resistance corresponding to Ya, and C, the pure capacitance corresponding to Yb, p representing the imaginary angular frequency. On the other hand, calling m' the voltage transfer function for vb corresponding to m for va given by (4), this is readily obtained from (3), i.e.

$$m' = \left(\frac{-Ya}{Yb}\right)m = \frac{-Ya}{2Ya+Yb} = \frac{-1}{2+pCR} \quad (13)$$

In the above, the second expression for m' is again obtained from (10) and the final one by again introducing p, C and R, this showing that the DC gain at the output of A2 is only half the unitary gain at high frequency at the output of A1. If one had desired to obtain strictly complementary characteristics in terms of frequency for m and m', i.e. m−m' equal to unity, then this would have been achieved by making both Y3 and Y4 equal to Y1.

Finally, once the values of such admittances as Y1, Y2, Y3, and Y4 have been determined, those of G1 and G2 as well as the biassing voltages V1 and V2 can be found from (7) and (8). For instance, with Y1=Y2 as considered above, in case Y4=2Y3, a suitable solution will be G1=Y4 and G2=Y3 in the particular case where both V1 and V2 are equal to 0, i.e. ground reference potential. In case of unity gain both at high frequency at the output of A1 and for DC at the output of A2, this time with Y3=Y4, it is clear from (7) and (8) that this will be satisfied by G1=G2 and V1=V2.

As in the above mentioned European application No 0201635, suitable values for the biassing sources at the inverting and non-inverting inputs of A1 will lead to a non objectionable common mode voltage at the input of A1 as defined by e obtained from (11).

Figure 2:
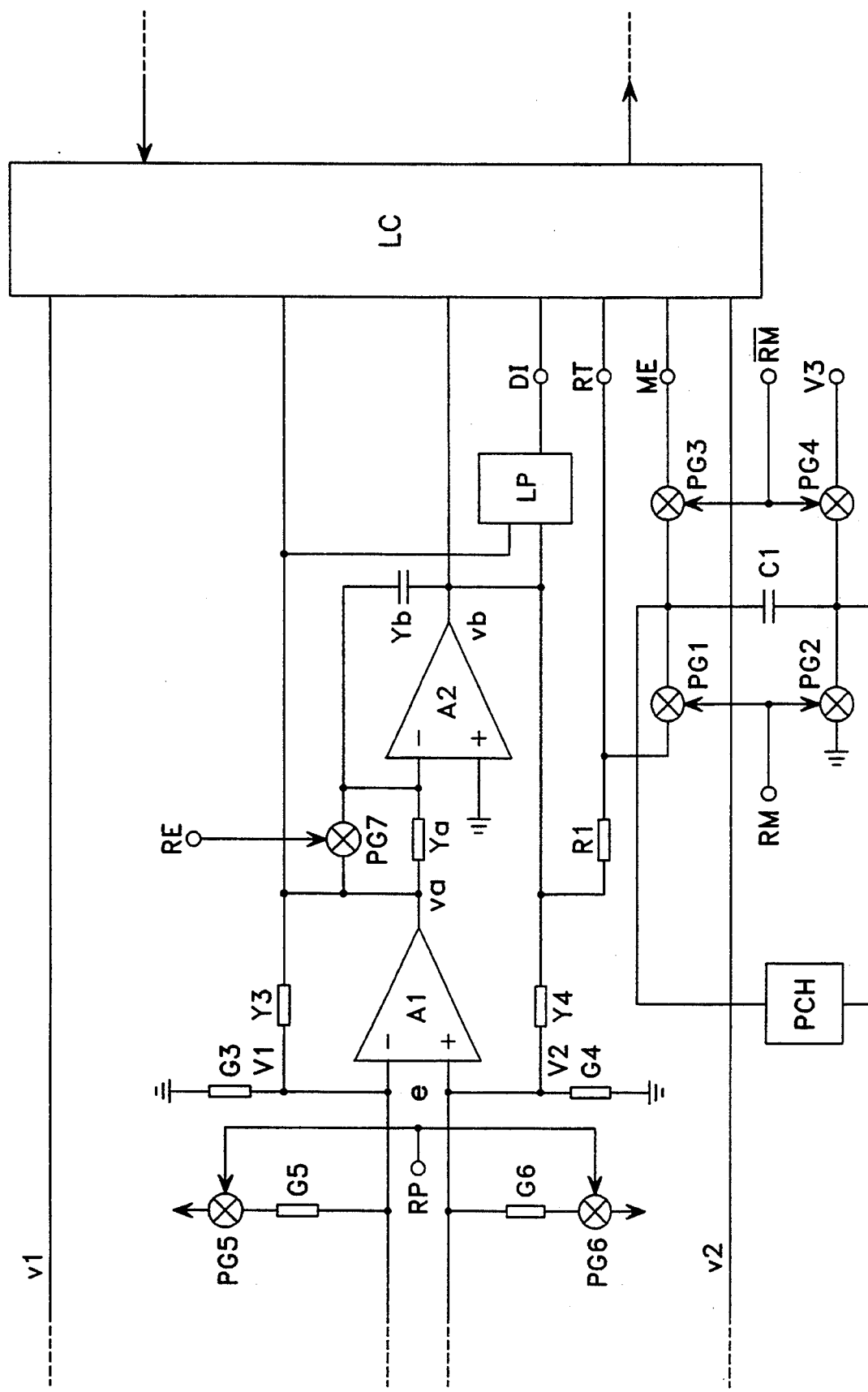
FIG. 2 shows modifications of FIG. 1 to illustrate specific features of the invention.

Referring now to FIG. 2, the latter shows various modifications with respect to FIG. 1 and starting with the outputs of A1 and A2, these voltages va and vb are additionally applied to a double input low pass filter LP whose output terminal DI is connected to LC in order that on hook and off hook, e.g. dialling, signals can be applied therein to a comparator in the general manner disclosed in the above-identified European application No 0201635. Indeed LP recombines the high pass (AC loop) and low pass (DC loop) outputs of A1 and A2 in order to apply an adequate reproduction of the rectangular dialling pulses, i,e, fundamental frequency and a reasonable number of harmonics. At the same time, LP attenuates frequencies above 400 Hz to eliminate remote metering pulse bursts. A double input first order switched capacitance filter is a desirable embodiment for LP. Feeding its output shunt capacitance by an equivalent series resistance at one input having twice the value of that for the other input may produce flat LP gains such that vb suffers only half the attenuation for va, thereby compensating the difference given by (12) and (13). However, this will produce an additional attenuation for both va and vb which can be avoided by using an ordinary single input switched capacitance filter receiving its input through a two-input multiplier/summing circuit fed by va and vb and producing va+2vb for the filter proper.

There is a further circuit between the output of A2 and LC so that the comparator therein can also detect ring trip signals when the called subscriber goes off hook during the ringing phase. As in the above-identified European application No 0201635, this occurs by way of a 3 Hz pass filter comprising series resistance R1 between the output of A2 and terminal RT of LC, series pass gate PG1 between RT and one terminal of shunt capacitance C1 whose other terminal is grounded through an additional pass gate PG2 controlled, like PG1, by terminal RM. Instead of the gates being merely unblocked by the ringing bit, the unblocking control signal applied to RM corresponds to the joint presence of the ring bit together with the absence of the metering shaping bit.

When the complementary condition $\overline{RM}$ is present, C1 is disconnected from RT and ground and instead is coupled between terminal ME of LC, leading to the metering shaping circuit, through pass gate PG3, and a suitable bias potential at terminal V3 through pass gate PG4, both gates being controlled by $\overline{RM}$.

FIG. 2 also shows that the biassing potentials V1 and V2 of FIG. 1, as well as the associated biassing resistances of conductance G1 and G2, are now obtained by potentiometers comprising the grounded resistances of conductance G3 and G4 in series with the resistances of conductance G5 and G6 coupled to negative battery through pass gates PG5 and PG6 respectively. Both the latter are unblocked by a signal RP at their commoned control terminals during the ringing phase.

Considering (7) and (8) giving the relations between V1, V2, G1 and G2, with the potentiometers G3, G4, G5 and G6 branched across the exchange battery these become $$Y1(G4+Y4) = Y2(G3+Y3) \qquad (7')$$

$$G5Y2 = G6Y1 \qquad (8')$$

showing that (8') is automatically true when PG5 and PG6 are blocked in order to reduce power consumption. Thus, if (7') and (8') are satisfied, the previous analysis remains valid both with G5 and G6 connected or disconnected. In the previously assumed symmetrical case with Y1=Y2, (8') shows that all that is necessary for the additional switched resistances of conductance G5 and G6 is that they should be equal to one another while (7) and 7') show that G3 and G4 take the place of G1 and G2 respectively. With resistance values of 60 kOhm for admittances Y1, Y'1, Y2, Y'2, Y3 and 30 kOhm for Y4 for instance, as previously assumed in relation to (12) and (13), G3 and G4 should have resistances of 30 kOhm and 60 kOhm respectively, as was true for G1 and G2.

Apart from the power consumption being reduced when PG5 and PG6 are blocked, at such moments the overall biassing resistances at the two inputs of the input operational amplifier A1 are larger, i.e. conductances G3+G5 and 64+G6 are reduced to G3 and G4 respectively. This improves the noise behaviour since for a noise signal at the inverting input of A1 for instance, the noise gain is a linear function of the overall input conductance divided by the feedback conductance Y3.

If the resistance of the unblocked pass gates PG5 and PG6 is not negligibly small with respect to the common value for G5 and G6, e.g. 20 kOhm, (8')implies that such a resistance value of PG5 and PG6, when these are conductive, must be accounted for when matching the total series resistance of G5 and PG5 to that of G6 and PG6. This matching involving PG5 and PG6 might be avoided by replacing them with a single pass gate common to both G5 and G6. However, this leads to the drawback that the latter would then have a common terminal. This implies that if the common pass gate PG5/6 has a non-negligible resistance when unblocked, this is equivalent to a non-infinite resistance between the two inputs of A1. Worse, in the reverse case of PG5/6 being blocked, even if it has an infinite resistance, the parasitic shunt between the two inputs of A1 will be equal to the sum of the resistances of G5 and G6, permanently connected at one end, e.g. 40 kOhm. Thus, two separate pass gates PG5 and PG6 may nevertheless be preferred bearing also in mind that a common one would not save chip space as it has to carry twice as much current.

While (5) and (6) imply that Y1, Y'1, Y2 and Y'2, which should additionally all be equal for a symmetrical Herter bridge, e.g. a common resistance value of 60 kOhm, should be realized as external components with very close tolerances, nevertheless, a slight shift from (5) and (6) may be considered, i.e.

$$\frac{1}{Y1} = \frac{1}{Y'1} + \frac{1}{Y0} \qquad (5')$$

$$\frac{1}{Y2} = \frac{1}{Y'2} + \frac{1}{Y0} \qquad (6')$$

In that case, the departure from the strict conditions of (5) and (6) has a counterpart in (5') and (6') producing a perfectly balanced condition of the Herter bridge between the v1/v2 port on the one hand and the e port on the other, on the assumption there is no loading at the v'1/v'2 port, i.e. open subscriber line. Thus, (5') and (6') correspond to the classical condition of a balanced two-port Wheatstone bridge and they offer the advantage that there is no DC offset from the zero level at the output of the sense amplifier for such an open line. In turn, considering line polarity reversals, this leads to equal positive or negative DC outputs depending on the polarity of the line current. With practical resistance values of 60 kOhm for Y'1 and Y'2 only while one would have 60.05 k Ohm for Y1 and Y2, in accordance with (5') and (6') for a symmetrical Herter bridge with 50 Ohm for Y0 and Y'0, the departure from (5) and (6) is less than 0.1%.

Finally, FIG. 2 shows yet another modification of FIG. 1 in that Ya is shunted by pass gate PG7. The latter is unblocked by a response time enhancer signal at terminal RE so that R in (12) and (13) is sharply decreased, with a corresponding increase in the frequency separating the high pass and low pass responses of A1 and A2. This signal at RE can be generated after off hook detection, e.g. during 5 msec, in order that DC level detection should be speeded up by the ensueing sharp reduction of the CR time constant whereas, prior to short circuiting of the subscriber line, there should be no effective detection of spurious fast DC variations.

While the principles of the invention have been described above in connection with specific apparatus, it is to be clearly understood that this description is made only by way of example and not as a limitation on the scope of the invention,

We claim:

1. An impedance synthesis multiple loop circuit of the type having a common loop part and separate DC and AC loop parts fed from the common loop part, said circuit be adapted for use with dialing pulses in the form of a fundamental dialling pulse frequency signal and associated harmonic dialling pulse frequency signals, the fundamental dialling pulse frequency being below a predetermined first frequency and the associated harmonic dialling pulse frequencies being above said predetermined first frequency and below a second predetermined frequency, said circuit also being adapted for use with telephone metering pulse bursts at frequencies above said second predetermined frequency, said circuit comprising:

an input stage cascaded with an output stage, said input and output stages each having an input and an output;

an overall negative feedback loop from the output of the output stage to the input of the input stage;

means associated with a first stage of said input and output stages for providing to the AC loop part a first output signal from which is excluded DC and low frequency components below said first predetermined frequency, said first output signal including said associate harmonic frequency signals and said metering pulse bursts;

means associated with a second stage of said input and output stages for providing to the DC loop part a second output signal which includes only DC and low frequency components below said first predetermined frequency said second output signal including said fundamental dialling pulse frequency signal;

a double input low pass filter having first and second inputs and an output, said filter having an associated passband with a predetermined cut off frequency higher than said first predetermined frequency and below said second predetermined frequency;

means for coupling said first and second output signals to the respective first and second inputs of said filter; and means responsive to a low frequency signal appearing at said output of the low pass filter and including both said fundamental dialling pulse frequency signal and said associated harmonic dialling pulse frequency signals but not including said telephone metering pulse bursts, for detecting said dialing pulses.

2. Impedance synthesis multiple loop circuit as claimed in claim 1, wherein a difference in respective high and low frequency flat gains of the two stages is compensated by different respective responses for the two inputs of the double input low pass filter.

3. Impedance synthesis multiple loop circuit as claimed in claim 1, wherein the inputs of the input stage are each biassed by respective one of a pair of voltage dividers, both said input voltage dividers are branched across first and second poles of a common DC potential source, and the impedance synthesis multiple loop further comprises controlled gating means for simultaneously disconnecting said first pole of the common DC potential source from each of said voltage dividers.

4. Impedance synthesis multiple loop circuit as claimed in claim 1, wherein said input stage further comprises a first operational amplifier having a first admittance between its output and its inverting input, a second operational amplifier, a second admittance coupling the output of the first operational amplifier to the inverting input of the second operational amplifier, a third admittance coupling the output of the second operational amplifier to the inverting input of the second operational amplifier, and a fourth admittance coupling the output of the second operational amplifier to the non-inverting input of the first operational amplifier to thereby complete said negative feedback loop.

5. Impedance synthesis multiple loop circuit as claimed in claim 4, wherein the impedance synthesis multiple loop is part of a telecommunication line circuit including a Herter bridge providing three pairs of admittances, with a first pair of terminals coupled to a bidirectional two wire line, a second pair of terminals coupled to said separate DC and AC loop parts and a third pair of terminals coupled to said input stage, the pair of Herter bridge admittances and of the Herter bridge connected to the inverting input of the first operational amplifier have a first common value Y1 and the pair of Herter bridge admittances connected to the non-inverting input of the first operational amplifier have a second common value Y2 whereby the voltage across said third pair of terminals solely depends on the sum of the voltages between the first terminals of said first and second pairs of terminals and between the second terminals of said first and second pairs of terminals and is directly proportional thereto, a first voltage source V1 and a first bias admittance G1 biasses the inverting input of the first operational amplifier, a second voltage source V2 and a second bias admittance G2 biasses the non-inverting input of the first operational amplifier, and a first source of voltage V1 and a first bias admittance G1 biasses the inverting input of the first operational amplifier, a second source of voltage V2 and a second bias admittance G2 biasses the non-inverting input of the first operational amplifier, and the values of the first and second voltage sources (V1, V2) and of the first and second bias admittances (G1, G2) are related to the values of the Herter bridge admittances Y1 and Y2 and to the values of said first and fourth admittances (Y3, Y4), with $$Y1-(G2+Y4)=Y2-(G1+Y3)$$

and $$G1-Y2-V1=G2-Y1-V2.$$

6. Impedance synthesis multiple loop circuit as claimed in claim 5, wherein the inputs of the input stage are each biassed by a respective one of a pair of voltage dividers, each of the voltage dividers comprises two admittance parts branched across a common DC potential source, the impedance synthesis multiple loop further comprises controlled gating means for simultaneously disconnecting a pole of the source from its respective admittance part of each of the voltage dividers, and said values V1, V2, Y1, Y2, Y3, Y4 are related to the values G3 and G4 of the respective admittance parts of the voltage dividers which remain connected to one pole of the source, and to the values G5 and G6 of the respective admittance parts which are connected to the other pole through the controlled gating means, with:

$$Y1-(G4+Y4)=Y2-(G3+Y3) \text{ and}$$
$$G5-Y2=G6-Y1.$$

7. Impedance synthesis multiple loop circuit as claimed in claim 1, wherein the output of the output stage is coupled to a low pass filter including a capacitance having at least one of its terminals connected to a pair of controlled gating means, a first said controlled gating means effectively inserting the capacitance into the low pass filter and a second said controlled gating means effectively inserting the capacitance into a telephone metering pulse shaping circuit.

8. Impedance synthesis multiple loop circuit as claimed in claim 4, wherein said input stages provide the output signal excluding low frequency components such as DC, and said first, second and fourth admittances are resistive, whilst said third admittance is frequency dependent, and said second admittance is associated with control means for temporarily and substantially reducing the resistance of said second admittance.

9. Impedance synthesis multiple loop circuit as claimed in claim 1, wherein said input stage is said first stage and said output stage is said second stage.

* * * * *